US012725727B2

(12) United States Patent
Huang et al.

(10) Patent No.: US 12,725,727 B2
(45) Date of Patent: Sep. 1, 2026

(54) DRY-TYPE TRANSFORMER AND WINDING METHOD THEREOF

(71) Applicant: Huawei Digital Power Technologies Co., Ltd., Shenzhen (CN)

(72) Inventors: Zhuyong Huang, Dongguan (CN); Xiaofei Zhang, Dongguan (CN); Xiaoqing Hu, Dongguan (CN); Zelong Zhang, Shenzhen (CN); Peng Shuai, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 847 days.

(21) Appl. No.: 17/830,908

(22) Filed: Jun. 2, 2022

(65) Prior Publication Data

US 2022/0392692 A1 Dec. 8, 2022

(30) Foreign Application Priority Data

Jun. 3, 2021 (CN) ......................... 202110621263.4

(51) Int. Cl.

| | |
|---|---|
| ***H01F 27/36*** | (2006.01) |
| ***H01F 27/24*** | (2006.01) |
| ***H01F 27/28*** | (2006.01) |
| ***H01F 41/00*** | (2006.01) |
| ***H01F 41/06*** | (2016.01) |

(52) U.S. Cl.

CPC ......... *H01F 27/2885* (2013.01); *H01F 27/24* (2013.01); *H01F 27/363* (2020.08); *H01F 41/005* (2013.01); *H01F 41/06* (2013.01)

(58) Field of Classification Search

CPC .... H01F 27/2885; H01F 27/24; H01F 27/363; H01F 2027/329; H01F 27/327; H01F 27/324; H01F 27/36; H01F 27/361; H01F 27/366

See application file for complete search history.

(56) References Cited

U.S. PATENT DOCUMENTS

| | | | | |
|---|---|---|---|---|
| 2,553,324 A * | 5/1951 | Lord | ........................ | H01F 27/36 336/84 R |
| 3,173,115 A * | 3/1965 | Peuron | .................... | H01F 38/26 336/84 R |

(Continued)

FOREIGN PATENT DOCUMENTS

| | | |
|---|---|---|
| CN | 1805082 A | 7/2006 |
| CN | 201804683 U | 4/2011 |

(Continued)

*Primary Examiner* — Mang Tin Bik Lian
(74) *Attorney, Agent, or Firm* — Rimon PC

(57) ABSTRACT

This application provides a dry-type transformer and a winding method thereof. The dry-type transformer includes a magnetic core, a first coil, a second coil, and a shielding component. The first coil is disposed around the exterior of the magnetic core, and the second coil is disposed around the exterior of the first coil. In a direction from the iron core to the second coil, the shielding component includes a first conducting layer, a second conducting layer, a third conducting layer, and a fourth conducting layer that are sequentially disposed at intervals, the first coil is disposed between the magnetic core and the first conducting layer, and the second coil is disposed between the second conducting layer and the third conducting layer.

14 Claims, 14 Drawing Sheets

(56) References Cited

U.S. PATENT DOCUMENTS

| | | | | | |
|---|---|---|---|---|---|
| 3,299,383 | A * | 1/1967 | Conner | H01F 38/30 | 336/84 R |
| 3,436,704 | A | 4/1969 | Keto et al. | | |
| 4,176,334 | A * | 11/1979 | Buritz | H01F 27/363 | 29/606 |
| 4,518,941 | A * | 5/1985 | Harada | H01F 27/36 | 363/20 |
| 4,864,265 | A | 9/1989 | Peoples et al. | | |
| 5,559,486 | A * | 9/1996 | Ikenoue | H01F 19/04 | 336/198 |
| 6,888,436 | B1 * | 5/2005 | Yagasaki | H01F 27/2885 | 336/84 R |
| 2010/0328005 | A1 * | 12/2010 | Sarver | H01F 27/327 | 336/199 |
| 2012/0092109 | A1 * | 4/2012 | Chartouni | F28D 15/0266 | 336/55 |
| 2014/0185337 | A1 * | 7/2014 | Espino | H01F 27/36 | 363/21.17 |
| 2015/0109090 | A1 | 4/2015 | Patel | | |
| 2016/0189858 | A1 * | 6/2016 | Bormann | H01F 27/34 | 336/150 |
| 2020/0168389 | A1 * | 5/2020 | Zhang | H01F 27/324 | |
| 2020/0191852 | A1 * | 6/2020 | Handy | H01F 27/36 | |
| 2021/0027936 | A1 * | 1/2021 | Tal | B60R 19/12 | |
| 2022/0037080 | A1 * | 2/2022 | Kovalevskii | H01F 27/327 | |

FOREIGN PATENT DOCUMENTS

| | | | |
|---|---|---|---|
| CN | 111863406 | A | 10/2020 |
| EP | 2833378 | A1 | 2/2015 |
| JP | 2011134873 | A | 7/2011 |

* cited by examiner

DRY-TYPE TRANSFORMER AND WINDING METHOD THEREOF

CROSS-REFERENCE TO RELATED APPLICATION

This application claims priority to Chinese Patent Application No. 202110621263.4, filed on Jun. 3, 2021, which is hereby incorporated by reference in its entirety.

TECHNICAL FIELD

This application relates to the field of transformer technologies, and specifically, to a dry-type transformer and a winding method thereof.

BACKGROUND

Insulation of a medium-voltage transformer or a high-voltage transformer has always been a difficult problem. On the one hand, an insulation medium needs to meet a dielectric breakdown voltage, and on the other hand, a requirement on a partial discharge parameter needs to be met to avoid electrical aging. Existing transformers may be classified into an oil-immersed transformers and dry-type transformers. An oil-immersed transformer uses oil as an insulation medium, which has an advantage of a simple design and a disadvantage of a need to add oil, leading to problems of oil leakage and frequent maintenance. A dry-type transformer uses a solid insulation material, and a proper air gap is reserved between a solid insulation material on a high-voltage side and a solid insulation material on a low-voltage side to ensure insulation, which has advantages of simplicity and reliability, and can overcome the problem of oil leakage of the oil-immersed transformer. However, the dry-type transformer has a disadvantage of a large size.

SUMMARY

This application provides a dry-type transformer and a winding method thereof, to reduce a size of the dry-type transformer without reducing insulation reliability.

According to a first aspect, this application provides a dry-type transformer. The dry-type transformer includes a magnetic core, a first coil, a second coil, and a shielding component. The first coil is disposed around the exterior of the magnetic core, and the second coil is disposed around the exterior of the first coil. In a direction from the iron core to the second coil, the shielding component includes a first conducting layer, a second conducting layer, a third conducting layer, and a fourth conducting layer that are sequentially disposed at intervals, the first coil is disposed between the magnetic core and the first conducting layer, and the second coil is disposed between the second conducting layer and the third conducting layer. On one side of an axial direction of the iron core, the first conducting layer and the fourth conducting layer are hermetically connected and both are equipotentially bonded to the first coil, and the second conducting layer and the third conducting layer are hermetically connected and both are equipotentially bonded to the second coil. The magnetic core and the first coil, the first coil and the first conducting layer, the first conducting layer and the second conducting layer, the second conducting layer and the second coil, the second coil and the third conducting layer, and the third conducting layer and the fourth conducting layer are each connected by using a solid insulation layer.

In the dry-type transformer provided in this application, one end of the first conducting layer and one end of the fourth conducting layer are hermetically connected and both are equipotentially bonded to the first coil, and one end of the second conducting layer and one end of the third conducting layer are hermetically connected and both are equipotentially bonded to the second coil. In addition, the magnetic core and the first coil, the first coil and the first conducting layer, the first conducting layer and the second conducting layer, the second conducting layer and the second coil, the second coil and the third conducting layer, and the third conducting layer and the fourth conducting layer are each connected by using a solid insulation layer. In this way, an electric field generated between the first coil and the second coil can be completely limited within the solid insulation layers between the first conducting layer and the second conducting layer and between the third conducting layer and the fourth conducting layer, so that an air gap may not be reserved between the first coil and the second coil, to reduce a size of the dry-type transformer, and avoid a problem of electrical aging of an insulation material caused by partial discharge between the first coil and the second coil.

In a possible implementation of this application, the solid insulation layer between the magnetic core and the first coil may be an insulation tape. The solid insulation layers between the first coil and the first conducting layer, between the first conducting layer and the second conducting layer, between the second conducting layer and the second coil, between the second coil and the third conducting layer, and between the third conducting layer and the fourth conducting layer may be organic insulation resin material layers such as epoxy resin.

In a possible implementation of this application, the first conducting layer and the fourth conducting layer may be an integrally connected structure, and the second conducting layer and the third conducting layer may be an integrally connected structure. In this way, hermetic connection effects between the first conducting layer and the fourth conducting layer and between the second conducting layer and the third conducting layer can be ensured, to prevent partial discharge. In a possible specific implementation of this application, the first conducting layer and the fourth conducting layer may form a U-shaped structure, and the second conducting layer and the third conducting layer may form a U-shaped structure.

In a possible implementation of this application, the first coil may be one of a low-voltage coil or a high-voltage coil, and the second coil may be the other of the low-voltage coil or the high-voltage coil. When the first coil is a low-voltage coil, the second coil may be a high-voltage coil. When the first coil is a high-voltage coil, the second coil may be a low-voltage coil. The low-voltage coil and the high-voltage coil are relative concepts, and specifically may be determined by using quantities of turns in the coils. For example, when the quantity of turns of the first coil is lower than that of the second coil, the first coil is a low-voltage coil, and the second coil is a high-voltage coil. When the quantity of turns of the first coil is higher than that of the second coil, the first coil is a high-voltage coil, and the second coil is a low-voltage coil.

In a possible implementation of this application, the first conducting layer, the second conducting layer, the third conducting layer, or the fourth conducting layer may be made of a conductor material or a semiconductor material, to implement conduction.

In a possible implementation of this application, an end of each of the first conducting layer, the second conducting layer, the third conducting layer, and the fourth conducting layer is provided with a hook that is bent and extended in a direction away from the first coil. Hooks are disposed, so that electric fields at the ends of the first conducting layer, the second conducting layer, the third conducting layer, and the fourth conducting layer can be more homogenized.

In a possible implementation of this application, each of the first conducting layer, the second conducting layer, the third conducting layer, and the fourth conducting layer is provided with a potential fixing point, to connect to the first coil or the second coil. With the potential fixing point, it can be convenient to connect to the first coil or the second coil.

In a possible implementation of this application, the dry-type transformer includes an auxiliary shielding member, the auxiliary shielding member includes a first auxiliary conducting layer and a second auxiliary conducting layer, the second auxiliary conducting layer is disposed around the exterior of the first auxiliary conducting layer, and an auxiliary insulation layer is disposed between the first auxiliary conducting layer and the second auxiliary conducting layer. The first auxiliary conducting layer is equipotentially bonded to one of the first coil or the second coil, and the second auxiliary conducting layer is equipotentially bonded to the other of the first coil or the second coil. The auxiliary shielding member is disposed, so that a leakage prevention effect can be further improved, to reduce partial discharge.

In a possible implementation of this application, both the first auxiliary conducting layer and the second auxiliary conducting layer may be an annular cylindrical structure.

In a possible implementation of this application, each of the first auxiliary conducting layer and the second auxiliary conducting layer is provided with a potential fixing point, to connect to the first coil or the second coil.

In a possible implementation of this application, a shape of the dry-type transformer includes, but is not limited to, a cylinder, an elliptic cylinder, or a square column.

According to a second aspect, this application provides a winding method of a dry-type transformer. The winding method includes the following steps:

preparing a first preform: providing a shielding component, where the shielding component includes a first conducting layer, a second conducting layer, a third conducting layer, and a fourth conducting layer that are sequentially disposed at intervals and have an annular structure, and on one side of an axial direction of the shielding component, one end of the first conducting layer and one end of the fourth conducting layer are hermetically connected, and one end of the second conducting layer and one end of the third conducting layer are hermetically connected; and respectively pouring an insulation material between the first conducting layer and the second conducting layer and between the third conducting layer and the fourth conducting layer, and coating an insulation material on a side surface of the first conducting layer that is away from the second conducting layer, a side surface of the second conducting layer that is away from the first conducting layer, and a side surface of the third conducting layer that is close to the second conducting layer, to form the first preform after the insulation material is cured;

inserting a first coil within a region surrounded by the first conducting layer, inserting a magnetic core within the first coil, and disposing an insulation layer between the magnetic core and the first coil;

inserting a second coil between the second conducting layer and the third conducting layer; and equipotentially bonding the first conducting layer and the fourth conducting layer to the first coil respectively, and equipotentially bonding the second conducting layer and the third conducting layer to the second coil respectively, to form the dry-type transformer.

In the winding method of a dry-type transformer according to this application, the first preform is first prepared, and then the first coil, the second coil, and the magnetic core are assembled, so that winding difficulty can be reduced. An environment needs to be controlled vacuum only in the process of preparing the first preform, and in another process, a process requirement is low, so that winding process difficulty and production costs can be significantly reduced. In addition, a structure of the dry-type transformer formed by using the winding method in this application is the same as that of the dry-type transformer in the first aspect of this application. In the first preform, one end of the first conducting layer and one end of the fourth conducting layer are hermetically connected and both are equipotentially bonded to the first coil, and one end of the second conducting layer and one end of the third conducting layer are hermetically connected and both are equipotentially bonded to the second coil. In addition, the magnetic core and the first coil, the first coil and the first conducting layer, the first conducting layer and the second conducting layer, the second conducting layer and the second coil, the second coil and the third conducting layer, and the third conducting layer and the fourth conducting layer are each connected by using a solid insulation layer. In this way, an electric field generated between the first coil and the second coil can be completely limited within the solid insulation layers between the first conducting layer and the second conducting layer and between the third conducting layer and the fourth conducting layer, so that an air gap may not be reserved between the first coil and the second coil, to reduce a size of the dry-type transformer, and avoid a problem of electrical aging of the insulation material caused by partial discharge between the first coil and the second coil.

In a possible implementation of this application, before the insulation material is respectively poured between the first conducting layer and the second conducting layer and between the third conducting layer and the fourth conducting layer, the shielding component may be further fixed by using an insulator.

In a possible implementation of this application, the insulation material may be respectively poured between the first conducting layer and the second conducting layer and between the third conducting layer and the fourth conducting layer in a vacuum pouring environment. The insulation material is poured under a vacuum condition, so that bubbles can be prevented from being generated in formed insulation layers and affecting an insulation effect of the insulation layers. Except when the insulation material is poured, for which a process environment needs to be controlled vacuum, other assembly processes do not need to be specially treated.

In a possible implementation of this application, free ends of the first conducting layer, the second conducting layer, the third conducting layer, and the fourth conducting layer may be further bent in a direction away from the first coil, to form hooks configured to homogenize an electric field. The hooks are formed, so that electric field distribution at the ends of the first conducting layer, the second conducting layer, the third conducting layer, and the fourth conducting layer can be more homogenized.

In a possible implementation of this application, potential fixing points are formed on the first conducting layer, the second conducting layer, the third conducting layer, and the fourth conducting layer, to connect to the first coil or the second coil. The potential connection points are formed, so that it can be convenient to connect to the first coil and the second coil.

In a possible implementation of this application, the winding method further includes a step of preparing a second preform. The second preform includes a first auxiliary conducting layer and a second auxiliary conducting layer, both the first auxiliary conducting layer and the second auxiliary conducting layer are made of a conducting material, and an insulation material is poured between the first auxiliary conducting layer and the second auxiliary conducting layer, to form an auxiliary insulation layer after the insulation material is cured. When the insulation material is poured between the first auxiliary conducting layer and the second auxiliary conducting layer, a process environment may also be a vacuum environment, to remove air in the poured insulation material and prevent bubbles from being generated in the formed auxiliary insulation layer.

In a possible implementation of this application, the winding method further includes connecting the second preform to the first preform. The first auxiliary conducting layer is equipotentially bonded to one of the first coil or the second coil, and the second auxiliary conducting layer is equipotentially bonded to the other of the first coil or the second coil.

REFERENCE NUMERALS

Figure 1:
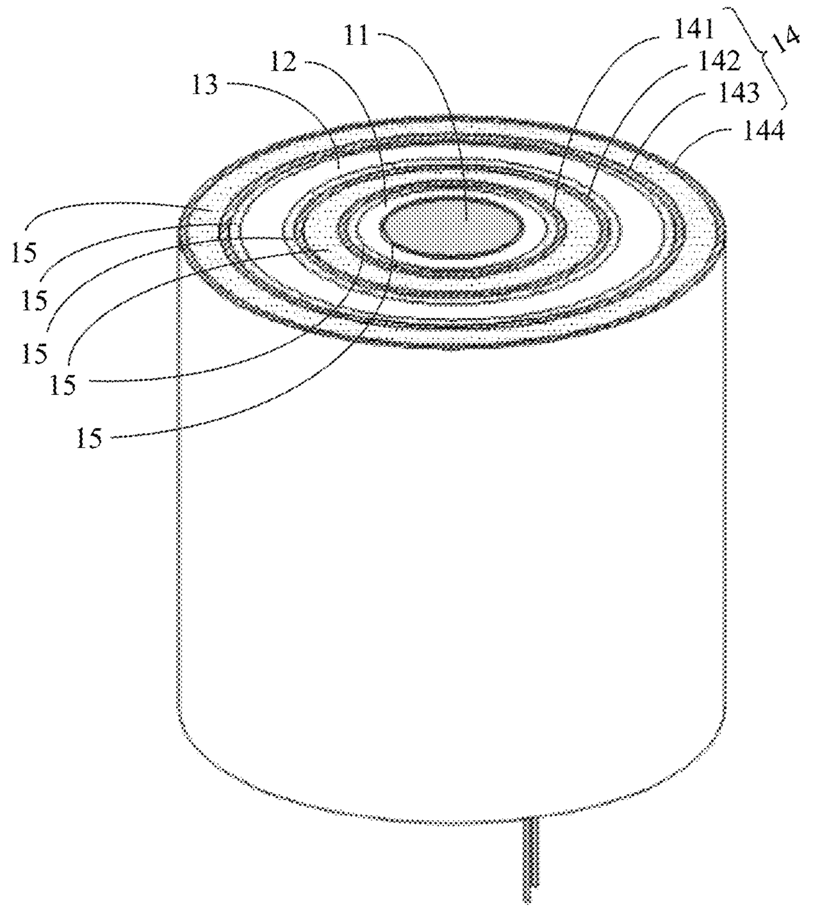
FIG. 1 is a schematic diagram of a structure of a dry-type transformer according to an embodiment of this application.

- 11: magnetic core; 12: first coil; 13: second coil; 14: shielding component; 141: first conducting layer; and 142: second conducting layer;
- 143: third conducting layer; 144: fourth conducting layer; 145: hook; 15: solid insulation layer; and 16: auxiliary shielding member; and
- 161: first auxiliary conducting layer; 162: second auxiliary conducting layer; and 163: auxiliary insulation layer.

DESCRIPTION OF EMBODIMENTS

To make objectives, technical solutions, and advantages of this application clearer, the following further describes this application in detail with reference to accompanying drawings.

Insulation of a medium-voltage transformer or a high-voltage transformer has always been a difficult problem. On the one hand, an insulation medium needs to meet a dielectric breakdown voltage and on the other hand, a partial discharge parameter needs to be met to avoid electrical aging. Existing transformers may be classified into an oil-immersed transformers and dry-type transformers. An oil-immersed transformer uses oil as an insulation medium, which has an advantage of a simple design and a disadvantage of a need to add oil, leading to problems of oil leakage and frequent maintenance. A existing dry-type transformer can effectively resolve the problem of oil leakage of the oil-immersed transformer. The dry-type transformer is generally an industrial-frequency transformer, whose operating frequency is generally 50 Hz. During winding of the existing dry-type transformer, an epoxy resin material is first poured on a low-voltage coil and a high-voltage coil respectively, and then a high-voltage coil casting body and a low-voltage coil casting body are installed together, between which a sufficient air gap is reserved to ensure insulation. In the winding process, it is necessary in all steps to consider a problem of bubble discharge when an insulation material such as epoxy resin is poured, as well as how to protect the first coil and the second coil in the pouring process. Therefore, the existing pouring manner has problems of a complex process and a high requirement on a process condition. The dry-type transformer obtained by using the existing winding method has advantages of simplicity and reliability, and can overcome the problem of oil leakage of the oil-immersed transformer, but has a disadvantage of a large size.

To resolve the foregoing technical problems, this application provides a dry-type transformer.

Terms used in the following embodiments are merely intended to describe specific embodiments, but are not intended to limit this application. The terms "one", "a", "the", "the foregoing", "this", and "the one" of singular forms used in this specification and the appended claims of this application are also intended to include plural forms, unless otherwise specified in the context clearly.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment, instead, they mean "one or more but not all of the embodiments", unless otherwise specifically emphasized. The terms "include", "contain", "have", and their variants all mean "include but are not limited to", unless otherwise specifically emphasized.

Figure 2:
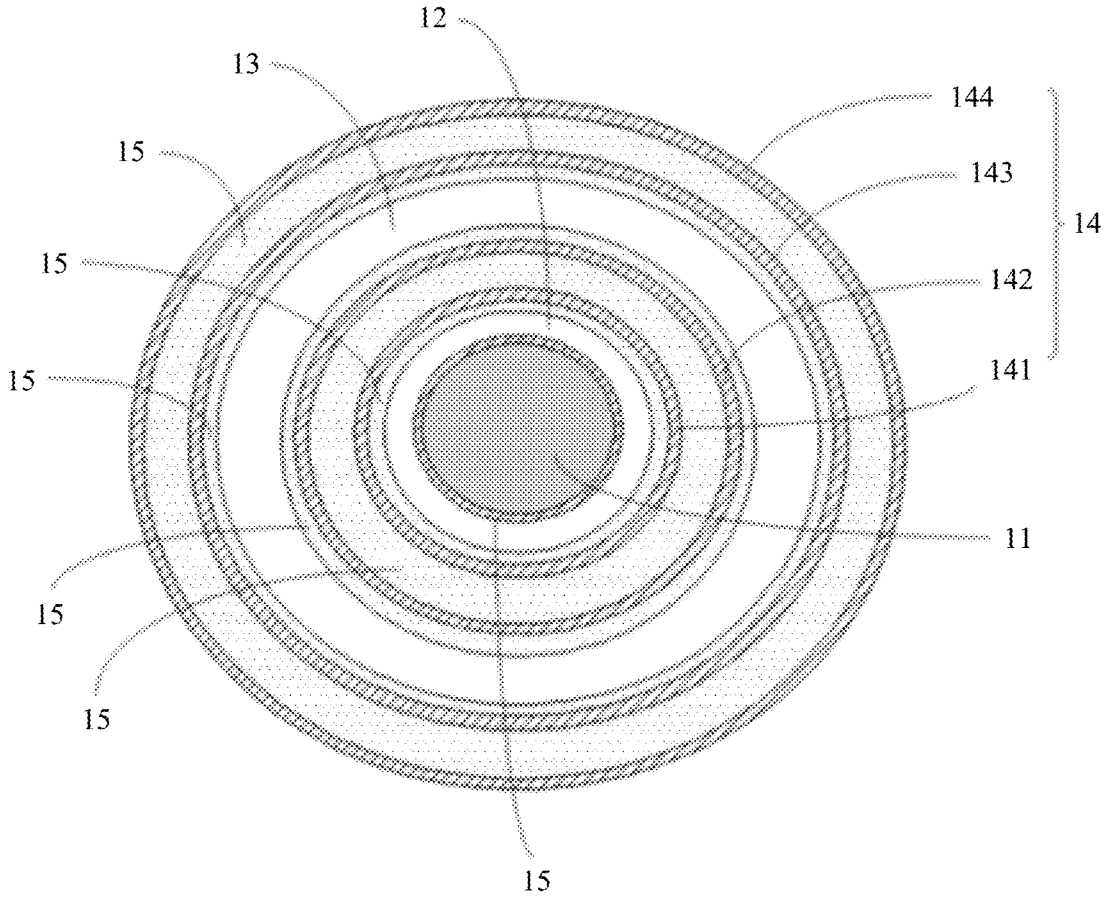
FIG. 2 is a schematic top view of a structure of a dry-type transformer according to an embodiment of this application.

FIG. 1 is a schematic diagram of a structure of a dry-type transformer according to an embodiment of this application. FIG. 2 is a schematic top view of a structure of a dry-type transformer according to an embodiment of this application. As shown in FIG. 1 and FIG. 2, in an embodiment of this application, the dry-type transformer includes a magnetic core 11, a first coil 12, a second coil 13, and a shielding component 14. A shape of the dry-type transformer may be a cylinder, an elliptic cylinder, or a square column. This is not specifically limited herein.

Figure 3:
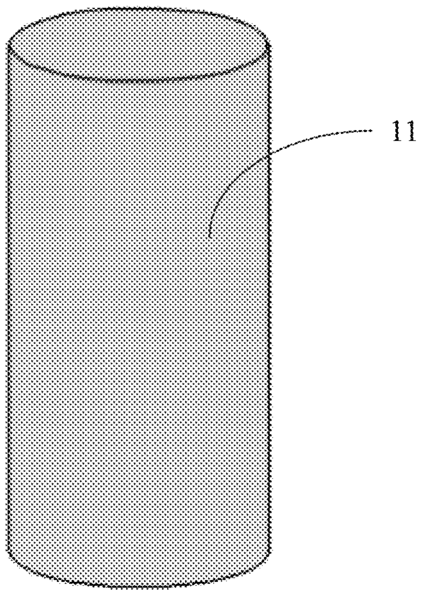
FIG. 3 is a schematic diagram of a structure of a magnetic core according to an embodiment of this application.

First, a structure of the magnetic core 11 is described. FIG. 3 is a schematic diagram of the structure of the magnetic core 11 according to an embodiment of this application. With reference to FIG. 1 to FIG. 3, in an embodiment of this application, a shape of the magnetic core 11 may be a cylinder, a square column, or an elliptic cylinder. The magnetic core 11 can enhance an electromagnetic induction effect, increase a magnetic flux, and reduce an eddy current loss, to increase electromagnetic induction intensity between different coils. The magnetic core 11 may be located within a region surrounded by the first coil 12.

Figure 4:
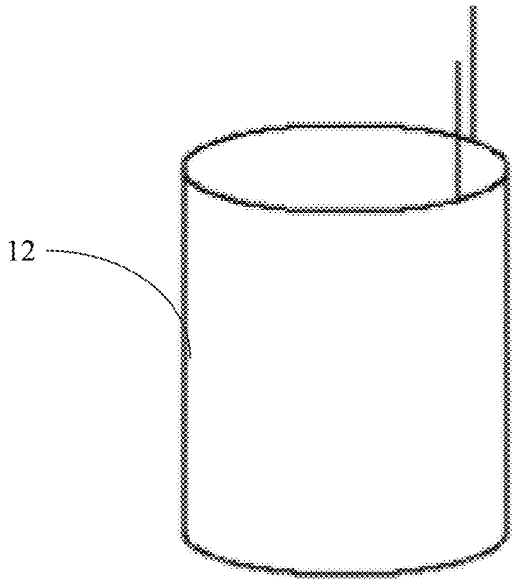
FIG. 4 is a schematic diagram of a structure of a first coil according to an embodiment of this application.

Next, a structure of the first coil 12 is described. FIG. 4 is a schematic diagram of the structure of the first coil 12 according to an embodiment of this application. Referring to FIG. 1, FIG. 2, and FIG. 4, in an embodiment of this application, the first coil 12 is disposed around the exterior of the magnetic core 11. A shape of the first coil 12 may be a cylinder, a square column, or an elliptic cylinder. The first coil 12 may be disposed coaxially with the magnetic core 11. To avoid a short circuit between the magnetic core 11 and the first coil 12, a solid insulation layer 15 may be provided between the magnetic core 11 and the first coil 12. The solid insulation layer 15 between the magnetic core 11 and the first coil 12 may be, for example, an insulation tape. The first coil 12 may be a low-voltage coil or a high-voltage coil, and a quantity of turns of the low-voltage coil is less than a quantity of turns of the high-voltage coil.

Figure 5:
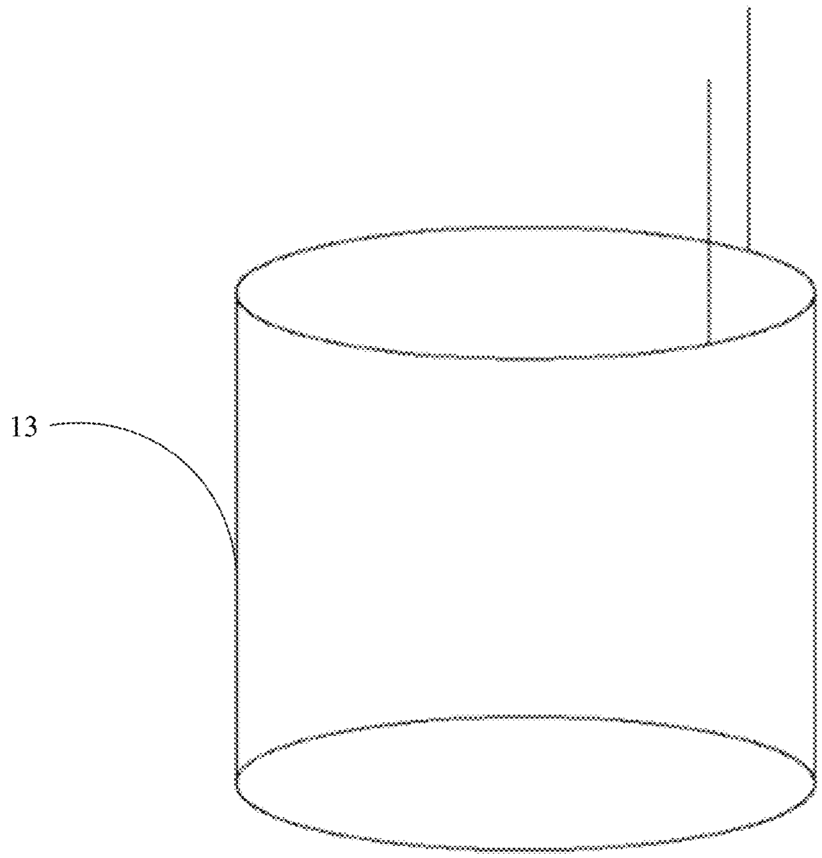
FIG. 5 is a schematic diagram of a structure of a second coil according to an embodiment of this application.

Then, a structure of the second coil 13 is described. FIG. 5 is a schematic diagram of the structure of the second coil 13 according to an embodiment of this application. Referring to FIG. 1, FIG. 2, and FIG. 5, in an embodiment of this application, the second coil 13 is disposed around the exterior of the first coil 12. A shape of the second coil 13 may be a cylinder, a square column, or an elliptic cylinder. The second coil 13 may be disposed coaxially with the first coil 12 and the magnetic core 11. When the first coil 12 is a low-voltage coil, the second coil 13 may be a high-voltage coil. When the first coil 12 is a high-voltage coil, the second coil 13 may be a low-voltage coil.

Figure 6:
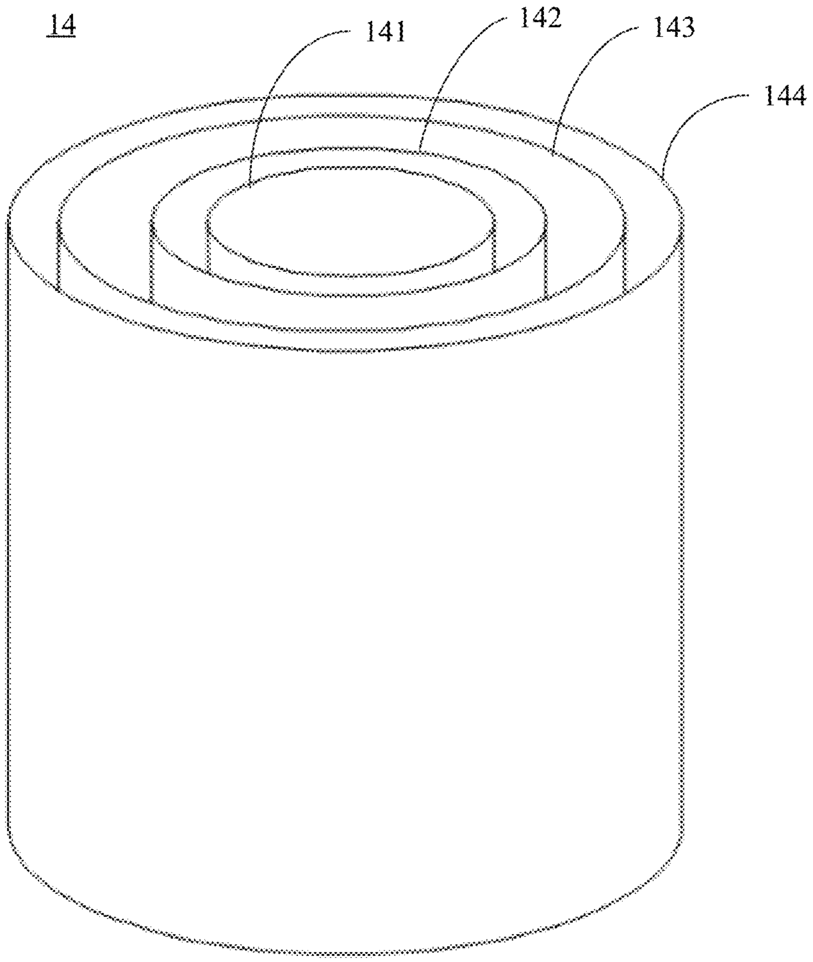
FIG. 6 is a schematic diagram of a structure of a shielding component according to an embodiment of this application.

Then, a structure of the shielding component 14 is described. FIG. 6 is a schematic diagram of the structure of the shielding component 14 according to an embodiment of this application. Referring to FIG. 1, FIG. 2, and FIG. 6, in an embodiment of this application, in a direction from the magnetic core 11 to the second coil 13, the shielding component 14 includes a first conducting layer 141, a second conducting layer 142, a third conducting layer 143, and a fourth conducting layer 144 that are sequentially disposed at intervals. In an orthographic projection in an axial direction of the magnetic core 11, the first conducting layer 141, the second conducting layer 142, the third conducting layer 143, and the fourth conducting layer 144 all have an annular structure, which may be, for example, a circular ring, a square ring, or an elliptic ring. In the orthographic projection plane, both the first coil 12 and the magnetic core 11 are located within a region surrounded by the first conducting layer 141. In this case, the first coil 12 is located between the magnetic core 11 and the first conducting layer 141, and the second coil 13 is located between the second conducting layer 142 and the third conducting layer 143.

The first conducting layer 141, the second conducting layer 142, the third conducting layer 143, and the fourth conducting layer 144 are made of a conductor material, or may be made of a semiconductor material.

Still referring to FIG. 1 and FIG. 2, in an embodiment of this application, both the first conducting layer 141 and the fourth conducting layer 144 are equipotentially bonded to the first coil 12, and both the second conducting layer 142 and the third conducting layer 143 are equipotentially bonded to the second coil 13. The first conducting layer 141 and the fourth conducting layer 144 may be provided with a potential fixing point to connect to the first coil 12. The second conducting layer 142 and the third conducting layer 143 may be provided with a potential fixing point to connect to the second coil 13.

Other than an equipotential bonding point, a solid insulation layer 15 is filled at another position between the first conducting layer 141 and the first coil 12, to ensure that the first conducting layer 141 and the first coil 12 are in a mutually insulated state at another position other than the equipotential bonding point. A thickness of the solid insulation layer 15 between the first conducting layer 141 and the first coil 12 may be 0.5 to 1.5 mm, and an insulation strength of about 500 V to 1000 V may be provided to the first conducting layer.

Similarly, other than an equipotential bonding point, a solid insulation layer 15 is disposed at another position between the second conducting layer 142 and the second coil 13, and at another position between the third conducting layer 143 and the second coil 13. A thickness of the solid insulation layer 15 between the second conducting layer 142 and the second coil 13 may be 0.5 to 1.5 mm, and an insulation strength of about 500 V to 1000 V may be provided to the second conducting layer 142. A thickness of the solid insulation layer 15 between the third conducting layer 143 and the second coil 13 may be 0.5 to 1.5 mm, and an insulation strength of about 500 V to 1000 V may be provided to the third conducting layer 143.

Still referring to FIG. 1 and FIG. 2, in an embodiment of this application, a solid insulation layer 15 is also disposed between the first conducting layer 141 and the second conducting layer 142 and between the third conducting layer 143 and the fourth conducting layer 144. In this way, an electric field generated by a voltage difference between the first coil 12 and the second coil 13 can be completely limited within the solid insulation layer 15 between the first conducting layer 141 and the second conducting layer 142 and the solid insulation layer 15 between the third conducting layer 143 and the fourth conducting layer 144.

A sum of a thicknesses of the solid insulation layer 15 between the first conducting layer 141 and the second conducting layer 142 and a thicknesses of the solid insulation layer 15 between the third conducting layer 143 and the fourth conducting layer 144 needs to meet a highest voltage insulation requirement of the dry-type transformer, which may be specifically set based on voltage values of the first coil 12 and the second coil 13. This is not specifically limited herein.

Still referring to FIG. 1 and FIG. 2, at one end of the axial direction of the magnetic core 11, such as the bottom of the magnetic core 11 shown in FIG. 1 and FIG. 2, the first conducting layer 141 and the fourth conducting layer 144 are hermetically connected, and the second conducting layer 142 and the third conducting layer 143 are hermetically connected.

Figure 7:
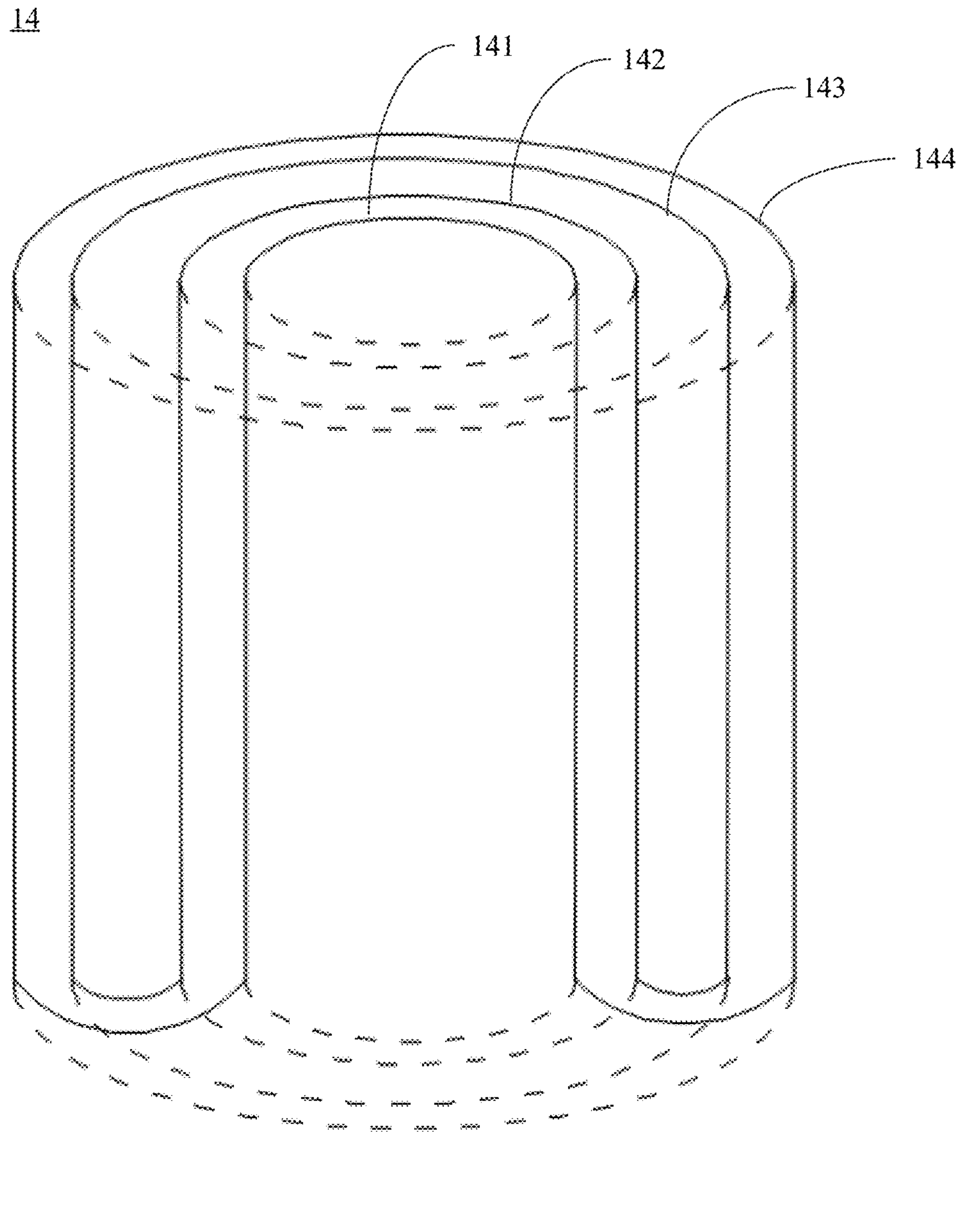
FIG. 7 is a schematic cross-sectional view of a structure of a shielding component according to an embodiment of this application.

FIG. 7 is a schematic diagram of the structure of the shielding component 14 according to an embodiment of this application. As shown in FIG. 7, in an embodiment of this application, the first conducting layer 141 and the fourth conducting layer 144 are an integrally connected structure, and the second conducting layer 142 and the third conducting layer 143 are an integrally connected structure. Specifically, the first conducting layer 141 and the fourth conducting layer 144 may form a U-shaped structure, and the second conducting layer 142 and the third conducting layer 143 may form a U-shaped structure. An annular U-shaped groove is formed between the first conducting layer 141 and the fourth conducting layer 144, and an annular U-shaped groove is formed between the second conducting layer 142 and the third conducting layer 143. The U-shaped groove that is formed between the second conducting layer 142 and the third conducting layer 143 and has an annular structure that is located inside the U-shaped groove formed between the first conducting layer 141 and the fourth conducting layer 144, and the two U-shaped grooves are spaced, to fill in an insulation material and form solid insulation layers 15. The U-shaped grooves are disposed, so that insulation of the dry-type transformer can be ensured, to avoid a problem such as leakage or partial discharge.

Figure 8:
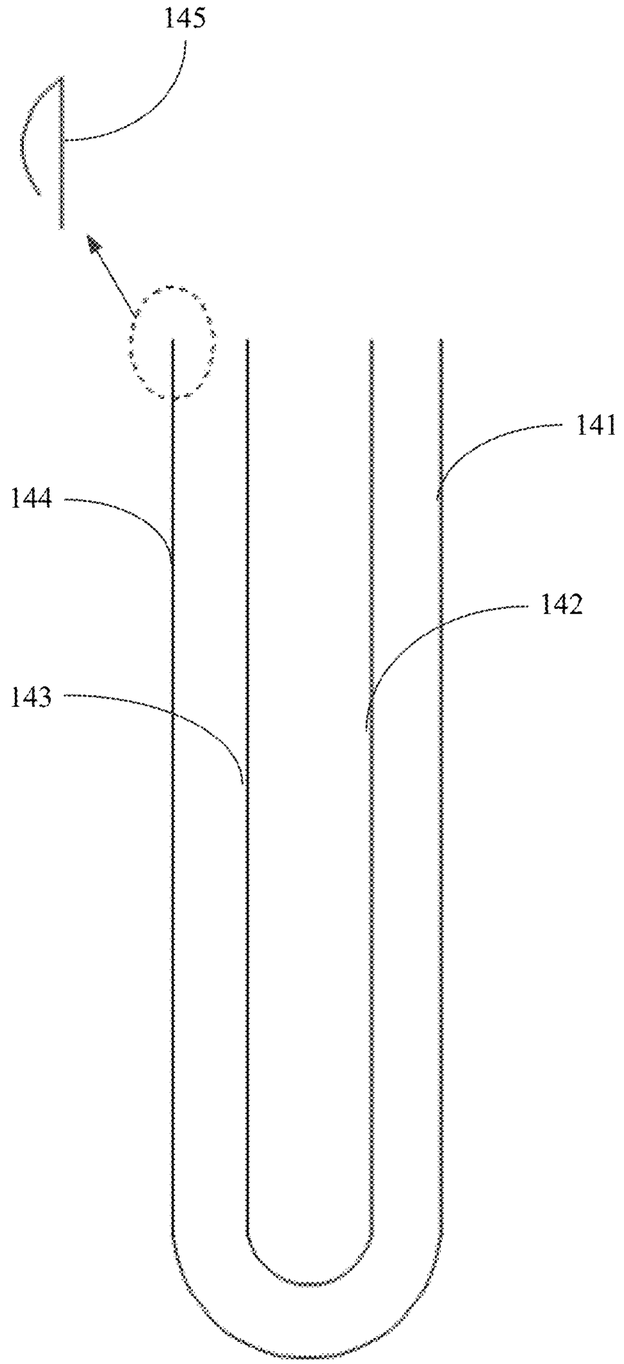
FIG. 8 is a schematic diagram of a structure of an opening end of a shielding component according to an embodiment of this application.

FIG. 8 is a schematic diagram of a structure of an opening end of the shielding component 14 according to an embodiment of this application. As shown in FIG. 8, in an embodiment of this application, an end of each of the first conducting layer 141, the second conducting layer 142, the third conducting layer 143, and the fourth conducting layer 144 is provided with a hook 145 configured to homogenize an electric field. Referring to FIG. 2, using the fourth conducting layer 144 as an example, a hook 145 is disposed at a free end of the fourth conducting layer 144, and the hook 145 is bent from the end of the fourth conducting layer 144 in a direction away from the first coil 12. The hook 145 can be used to homogenize an electric field at the end of the fourth conducting layer 144. For design of hooks 145 at free ends of the third conducting layer 143, the second conducting layer 142, and the first conducting layer 141, refer to the design of the hook 145 of the fourth conducting layer 144. Details are not described herein again.

Figure 9:
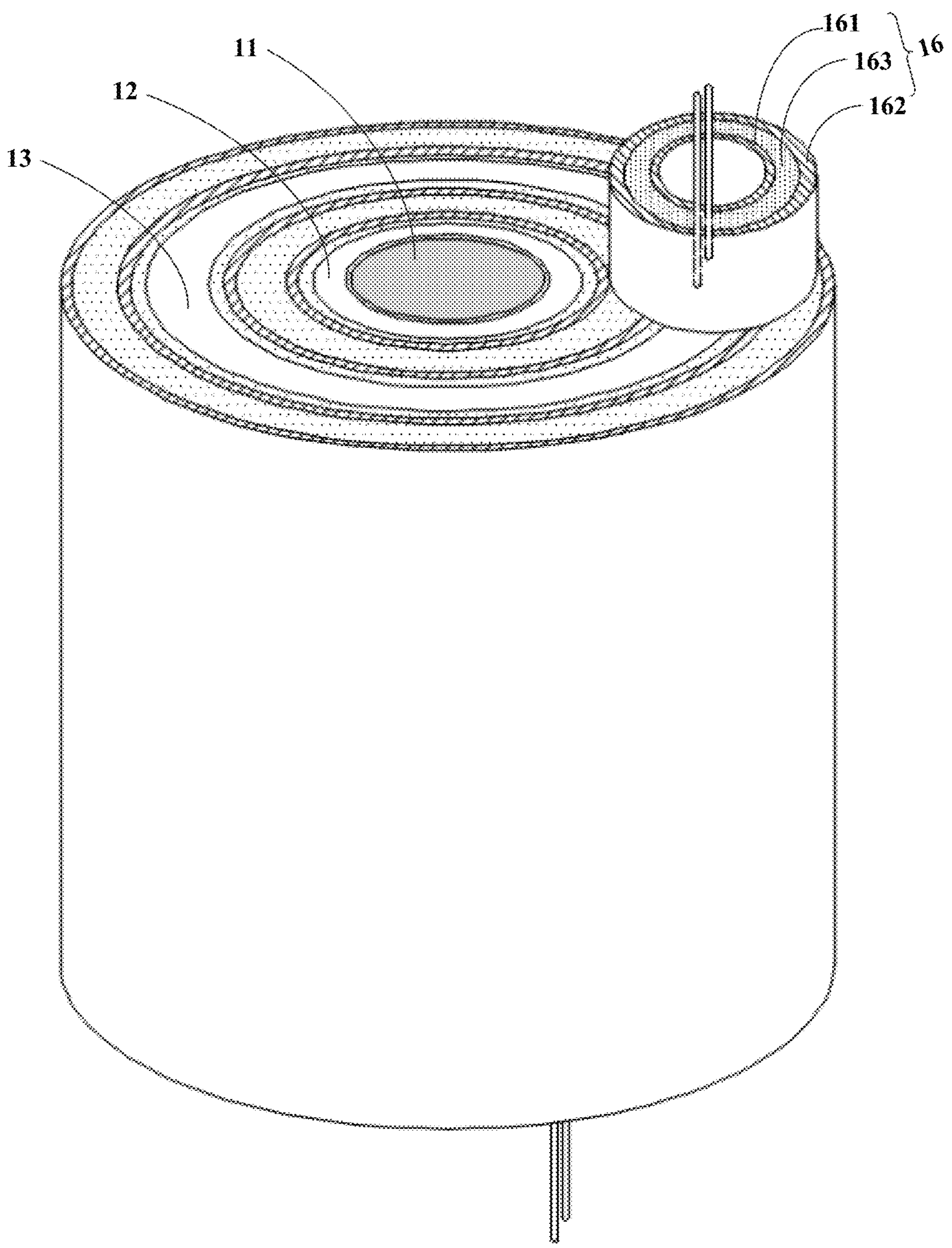
FIG. 9 is a schematic diagram of a structure of a dry-type transformer according to an embodiment of this application.

FIG. 9 is a schematic diagram of a structure of a dry-type transformer according to an embodiment of this application. As shown in FIG. 9, in an embodiment of this application, in addition to the structure shown in FIG. 1, the dry-type transformer further includes an auxiliary shielding member 16.

Figure 10:
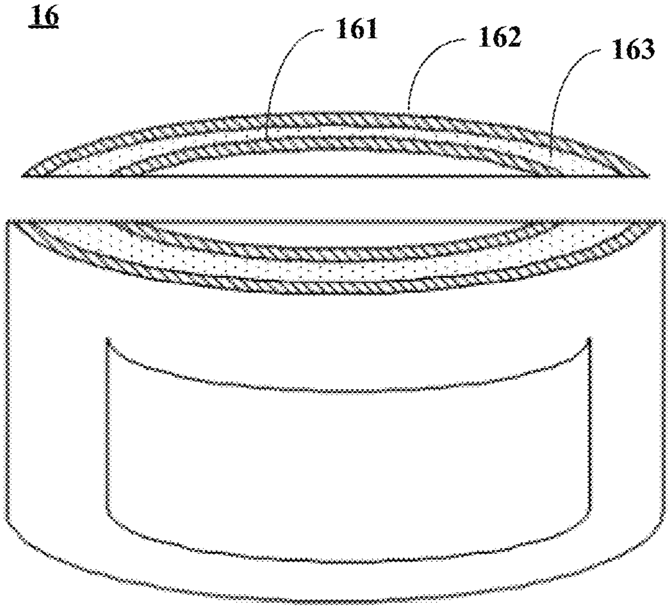
FIG. 10 is a schematic diagram of a structure of an auxiliary shielding member according to an embodiment of this application.

FIG. 10 is a schematic diagram of a structure of the auxiliary shielding member 16 according to an embodiment of this application. Referring to FIG. 9 and FIG. 10, in an embodiment of this application, the auxiliary shielding member 16 includes a first auxiliary conducting layer 161 and a second auxiliary conducting layer 162, and the second auxiliary conducting layer 162 is disposed around the exterior of the first auxiliary conducting layer 161. An auxiliary insulation layer 163 is disposed between the first auxiliary conducting layer 161 and the second auxiliary conducting layer 162. The first auxiliary conducting layer 161 is equipotentially bonded to one of the first coil 12 or the second coil 13, and the second auxiliary conducting layer 162 is equipotentially bonded to the other of the first coil 12 or the second coil 13.

When the auxiliary shielding member 16 is disposed, the auxiliary shielding member 16 may be spaced from the magnetic core 11, the first coil 12, the second coil 13, and the shielding component 14, so that the magnetic core 11, the first coil 12, the second coil 13, and the shielding component 14 are insulated from the auxiliary shielding member 16.

Referring to FIG. 10, in an embodiment of this application, both the first auxiliary conducting layer 161 and the second auxiliary conducting layer 162 are an annular cylindrical structure. For example, the first auxiliary conducting layer 161 may be divided into two semi-cylindrical structural units, and the second auxiliary conducting layer 162 may be divided into two semi-cylindrical structural units.

To facilitate the connection between the first auxiliary conducting layer 161 and the first coil 12 or the second coil 13, the first auxiliary conducting layer 161 is provided with a potential fixing point, and to facilitate the connection between the second auxiliary conducting layer 162 and the first coil 12 or the second coil 13, the second auxiliary conducting layer 162 is also provided with a potential fixing point. It may be understood that, positions at which the potential fixing points of the first auxiliary conducting layer 161 and the second auxiliary conducting layer 162 are disposed may be set based on specific connection positions of the first coil 12 and the second coil 13. This is not specifically limited herein.

Figure 11:
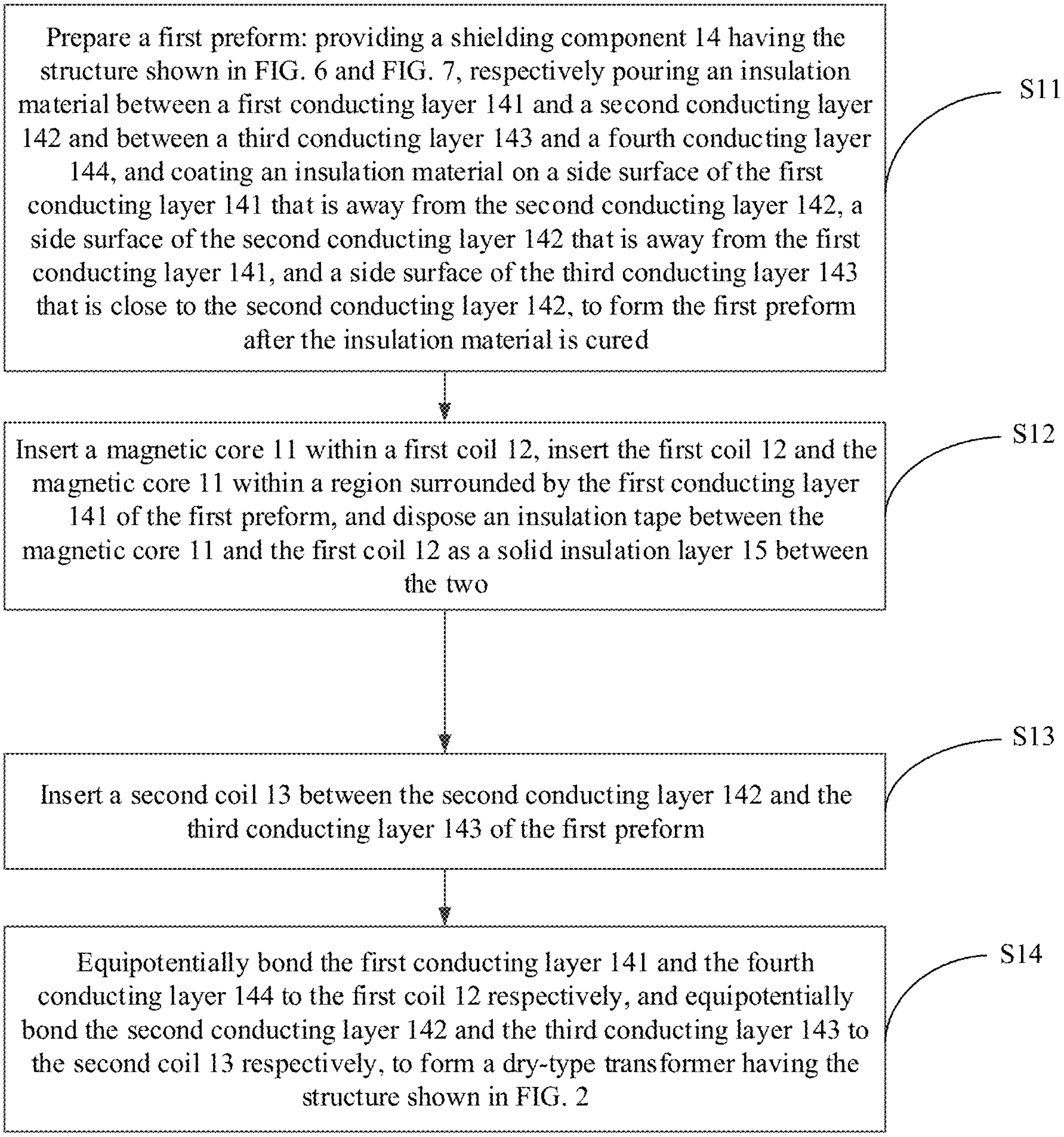
FIG. 11 is a schematic diagram of a structure of a first preform according to an embodiment of this application.
Figure 12:
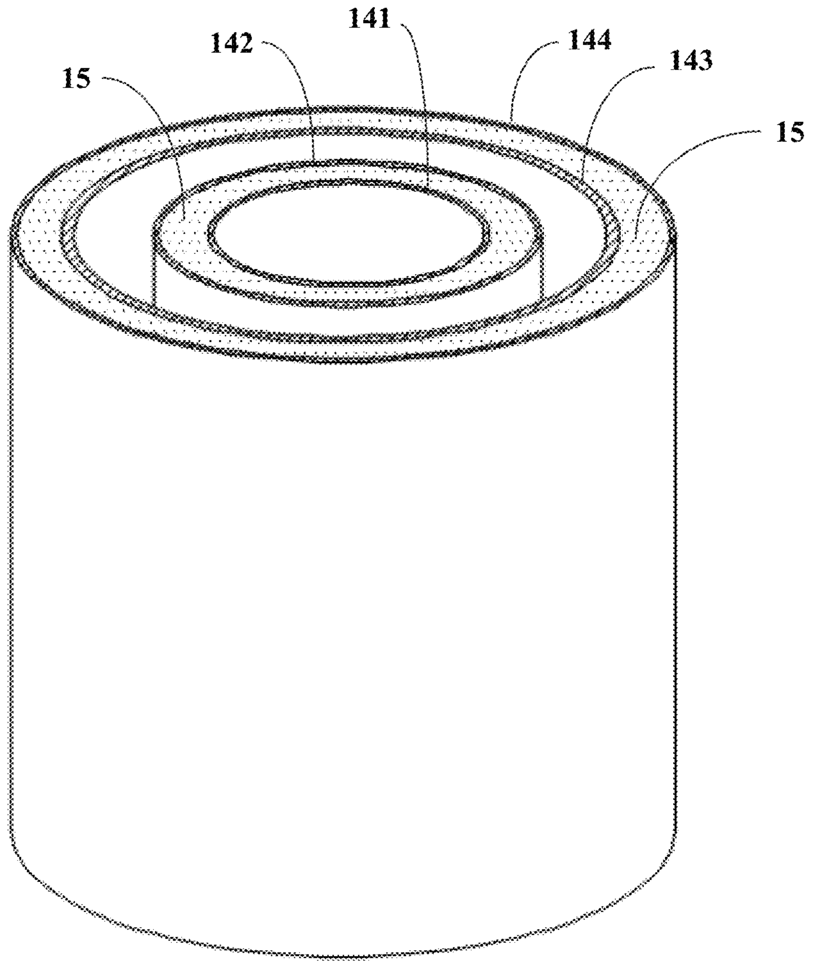
FIG. 12 is a schematic diagram of an assembled structure of a magnetic core and a first coil according to an embodiment of this application.

Based on a same technical concept, an embodiment of this application further provides a winding method of a dry-type transformer. As shown in FIG. 11, the winding method includes the following steps:

Step S11: Prepare a first preform: providing a shielding component 14 having the structure shown in FIG. 6 and FIG. 7, where the shielding component 14 includes a first conducting layer 141, a second conducting layer 142, a third conducting layer 143, and a fourth conducting layer 144 that are sequentially disposed at intervals and have an annular structure, and on one side of an axial direction of the shielding component 14, one end of the first conducting layer 141 and one end of the fourth conducting layer 144 are hermetically connected, and one end of the second conducting layer 142 and one end of the third conducting layer 143 are hermetically connected; and respectively pouring an insulation material between the first conducting layer 141 and the second conducting layer 142 and between the third conducting layer 143 and the fourth conducting layer 144, and coating an insulation material on a side surface of the first conducting layer 141 that is away from the second conducting layer 142, a side surface of the second conducting layer 142 that is away from the first conducting layer 141, and a side surface of the third conducting layer 143 that is close to the second conducting layer 142, to form the first preform after the insulation material is cured. A structure of the formed first preform is shown in FIG. 12.

Figure 13:
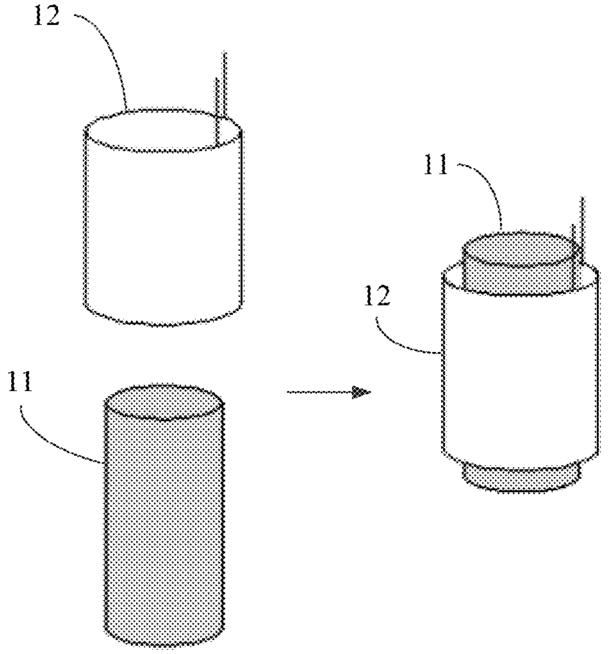
FIG. 13 is a schematic assembling diagram of inserting a second coil between a second conducting layer and a third conducting layer according to an embodiment of this application.

Step S12: As shown in FIG. 13, and referring to FIG. 1, insert a magnetic core 11 within a first coil 12, insert the first coil 12 and the magnetic core 11 within a region surrounded by the first conducting layer 141 of the first preform, and dispose an insulation tape between the magnetic core 11 and the first coil 12 as a solid insulation layer 15 between the two.

Figure 14:
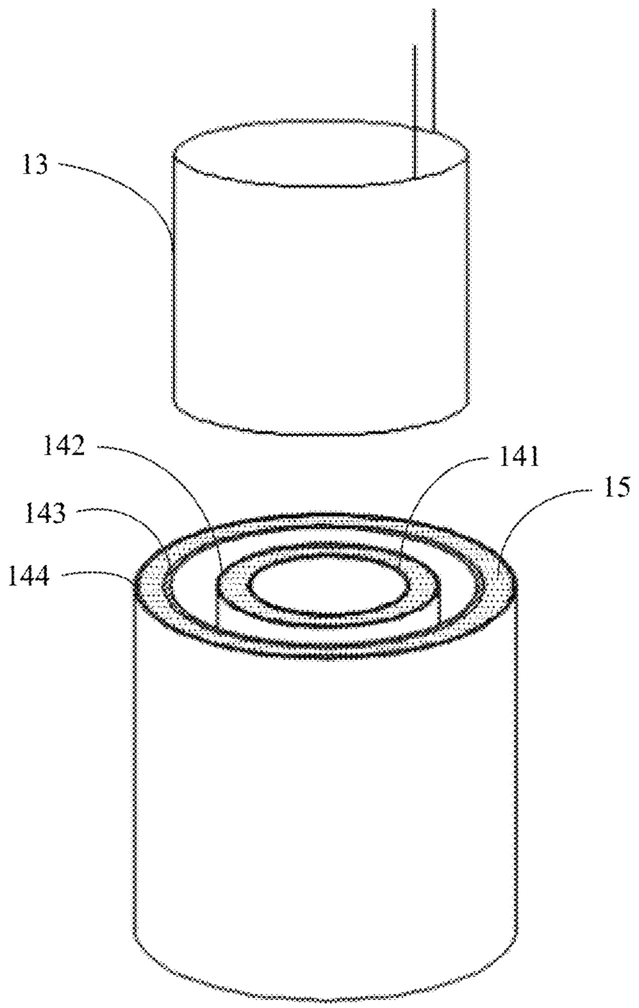
FIG. 14 is a diagram of a relative position relationship between a first auxiliary conducting layer and a second auxiliary conducting layer according to an embodiment of this application, where FIG. 15(*a*) is a top view, FIG. 15(*b*) is a front view, and FIG. 15(*c*) is a side view.

Step S13: As shown in FIG. 14, insert a second coil 13 between the second conducting layer 142 and the third conducting layer 143 of the first preform.

Step S14: Equipotentially bond the first conducting layer 141 and the fourth conducting layer 144 to the first coil 12 respectively, and equipotentially bond the second conducting layer 142 and the third conducting layer 143 to the second coil 13 respectively, to form a dry-type transformer having the structure shown in FIG. 2.

After the shielding component 14 is equipotentially bonded to the first coil 12 and the second coil 13, the winding method of a dry-type transformer may further include a step of pouring an insulation material as a whole, to form an insulation layer on surfaces of the parts and fixedly connect the parts.

Still referring to FIG. 6 and FIG. 7, in an embodiment of this application, in step S11, before the insulation material is respectively poured between the first conducting layer 141 and the second conducting layer 142 and between the third conducting layer 143 and the fourth conducting layer 144, the winding method further includes: first fixing the shielding component 14 by using an insulator, and then respectively pouring the insulation material between the first conducting layer 141 and the second conducting layer 142 and between the third conducting layer 143 and the fourth conducting layer 144. The first conducting layer 141, the second conducting layer 142, the third conducting layer 143, and the fourth conducting layer 144 in the shielding component 14 are first fixed by using the insulator, and then the insulation material is poured, so that the shielding component 14 can be prevented from shaking in a pouring process and affecting a pouring effect.

In an embodiment of this application, in step S11, when the insulation material is respectively poured between the first conducting layer 141 and the second conducting layer 142 and between the third conducting layer 143 and the fourth conducting layer 144, a pouring environment is a vacuum environment. The insulation material is poured in a vacuum environment, so that bubbles can be prevented from being generated, to effectively ensure insulation performance of obtained solid insulation layers 15.

In an embodiment of this application, free ends of the first conducting layer 141, the second conducting layer 142, the third conducting layer 143, and the fourth conducting layer 144 are bent to form hooks 145 configured to homogenize an electric field, as shown in FIG. 8. Referring to FIG. 2, using the fourth conducting layer 144 as an example, a free end of the fourth conducting layer 144 is bent in a direction away from the first coil 12 to form a hook 145. The hook 145 can be used to homogenize an electric field at the end of the fourth conducting layer 144. For ways of bending hooks 145 at free ends of the third conducting layer 143, the second conducting layer 142, and the first conducting layer 141, refer to that of the fourth conducting layer 144. Details are not described herein again.

In an embodiment of this application, potential fixing points are formed on the first conducting layer 141, the second conducting layer 142, the third conducting layer 143, and the fourth conducting layer 144, to connect to the first coil 12 or the second coil 13.

Figure 15A:
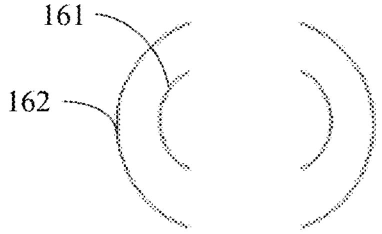
Figure 15B:
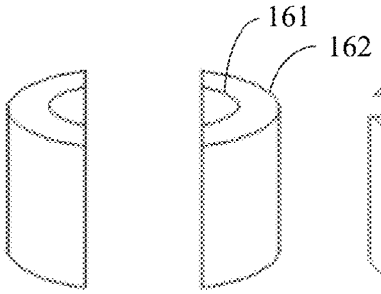
Figure 15C:
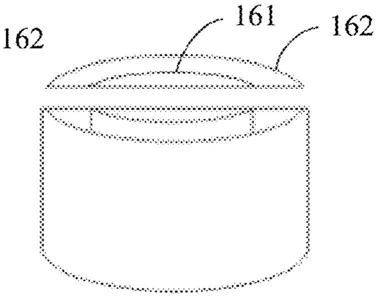

In an embodiment of this application, the winding method further includes a step of preparing a second preform, that is, an auxiliary shielding member. For a structure of the second preform, refer to FIG. 10. FIG. 15(*a*) to FIG. 15(*c*) are a diagram of a relative position relationship between a first auxiliary conducting layer 161 and a second auxiliary conducting layer 162 according to an embodiment of this application. Referring to FIG. 10 and FIG. 15(*a*) to FIG. 15(*c*), in an embodiment of this application, the second preform includes a first auxiliary conducting layer 161 and a second auxiliary conducting layer 162. Both the first auxiliary conducting layer 161 and the second auxiliary conducting layer 162 are made of a conducting material. An insulation material is poured between the first auxiliary conducting layer 161 and the second auxiliary conducting layer 162, to form an auxiliary insulation layer 163 after the insulation material is cured.

In an embodiment of this application, referring to FIG. 9, the winding method further includes connecting the second preform to the first preform. The first auxiliary conducting layer 161 is equipotentially bonded to one of the first coil 12 or the second coil 13, and the second auxiliary conducting layer 162 is equipotentially bonded to the other of the first coil 12 or the second coil 13.

According to the winding method in this embodiment of this application, winding difficulty of the dry-type transformer can be effectively reduced, an environment needs to be controlled vacuum only in the process of preparing the first preform and the second preform, and in another process, a process requirement is low, a process condition may not be limited, and parts can be assembled directly. In the prepared first preform and second preform, a problem of an electric field can be effectively resolved by using the shielding component and the auxiliary shielding member. In addition, for the first conducting layer, the second conducting layer, the third conducting layer, the fourth conducting layer, the first auxiliary conducting layer, and the second auxiliary conducting layer, a material having a same coefficient of thermal expansion as the solid insulation layer may be selected, to effectively resolve a problem of cracking caused by thermal expansion. In this way, reliability of the dry-type transformer can be improved.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A dry-type transformer, comprising:

a magnetic core, a first coil, and a second coil, wherein the first coil is disposed around an exterior of the magnetic core, and the second coil is disposed around an exterior of the first coil, wherein one of the first coil or the second coil is a low-voltage coil and the other of the first coil or the second coil is a high-voltage coil, and a quantity of turns of the low-voltage coil is less than a quantity of turns of the high-voltage coil;

a first shield comprising a first conducting layer, a second conducting layer, and a first insulation layer filling a first space therebetween, and disposed between the first coil and the second coil, wherein the first insulation layer has a thickness in the range of 0.5 mm to 1.5 mm; and a second shield comprising a third conducting layer, a fourth conducting layer, and a second insulation layer filling a second space therebetween, and disposed around an exterior of the second coil;

wherein an end of each of the first conducting layer, the second conducting layer, the third conducting layer, and the fourth conducting layer is provided with a hook that is bent and extended in a direction away from the first coil.

2. The dry-type transformer according to claim 1, wherein the first conducting layer and the fourth conducting layer are integrally connected, and the second conducting layer and the third conducting layer are integrally connected.

3. The dry-type transformer according to claim 2, wherein the first conducting layer and the fourth conducting layer form a U-shaped structure, and the second conducting layer and the third conducting layer form a U-shaped structure.

4. The dry-type transformer according to claim 1, wherein the first conducting layer, the second conducting layer, the third conducting layer, or the fourth conducting layer is made of a semiconductor material.

5. The dry-type transformer according to claim 2, wherein an end of each of the first conducting layer, the second conducting layer, the third conducting layer, and the fourth conducting layer is provided with a hook that is bent and extended in a direction away from the first coil.

6. The dry-type transformer according to claim 3, wherein an end of each of the first conducting layer, the second conducting layer, the third conducting layer, and the fourth conducting layer is provided with a hook that is bent and extended in a direction away from the first coil.

7. The dry-type transformer according to claim 1, wherein the first conducting layer and the fourth conducting layer are connected to the first coil, and the second conducting layer and the third conducting layer are connected to the second coil.

8. The dry-type transformer according to claim 2, wherein the first conducting layer and the fourth conducting layer are connected to the first coil, and the second conducting layer and the third conducting layer are connected to the second coil.

9. The dry-type transformer according to claim 3, wherein the first conducting layer and the fourth conducting layer are connected to the first coil, and the second conducting layer and the third conducting layer are connected to the second coil.

10. The dry-type transformer according to claim 1, further comprising an auxiliary shielding member comprising a first auxiliary conducting layer and a second auxiliary conducting layer, the second auxiliary conducting layer disposed around the exterior of the first auxiliary conducting layer, and an auxiliary insulation layer disposed between the first auxiliary conducting layer and the second auxiliary conducting layer; and the first auxiliary conducting layer is connected to one of the first coil or the second coil, and the second auxiliary conducting layer is connected to the other of the first coil or the second coil.

11. The dry-type transformer according to claim 10, wherein each of the first auxiliary conducting layer and the second auxiliary conducting layer is connected to the first coil or the second coil.

12. The dry-type transformer according to claim 10, wherein the first conducting layer, the second conducting layer, the third conducting layer, the fourth conducting layer, the first auxiliary conducting layer, and the second auxiliary conducting layer, all have a same coefficient of thermal expansion as the first and second insulation layers.

13. The dry-type transformer according to claim 1, further comprising a third insulation layer disposed between the magnetic core and the first coil.

14. The dry-type transformer according to claim 13, wherein the third insulation layer comprises an insulation tape.

* * * * *